US008862504B2

(12) United States Patent
Sobek (10) Patent No.: US 8,862,504 B2
(45) Date of Patent: Oct. 14, 2014

(54) METHOD AND SYSTEM FOR ACTIVATION AND FUNDING OF PREPAID CARD ACCOUNTS WITHIN A RESTRICTED AUTHORIZATION NETWORK

(75) Inventor: Michael F. Sobek, Leawood, KS (US)

(73) Assignee: Store Financial Services, LLC, Leawood, KS (US)

( * ) Notice: Subject to any disclaimer, the term of this patent is extended or adjusted under 35 U.S.C. 154(b) by 34 days.

(21) Appl. No.: 13/404,831

(22) Filed: Feb. 24, 2012

(65) Prior Publication Data

US 2012/0221422 A1    Aug. 30, 2012

Related U.S. Application Data

(60) Provisional application No. 61/446,814, filed on Feb. 25, 2011.

(51) Int. Cl.
*G06Q 20/00* (2012.01)

(52) U.S. Cl.
USPC ............................ 705/17; 235/380; 235/383

(58) Field of Classification Search
USPC ............... 705/17, 26.1, 39–41; 235/376, 379, 235/380, 382, 383; 379/114.16, 114.2; 340/5.6; 455/406, 407
See application file for complete search history.

(56) References Cited

U.S. PATENT DOCUMENTS

| 5,721,768 | A  | * | 2/1998  | Stimson et al. | ........ | 379/114.16 |
| 5,777,305 | A  |   | 7/1998  | Smith et al.   |          |            |
| 5,956,695 | A  |   | 9/1999  | Carrithers et al. |       |            |
| 6,612,487 | B2 | * | 9/2003  | Tidball et al. | ........ | 235/380    |
| 6,829,596 | B1 |   | 12/2004 | Frazee         |          |            |
| 6,837,426 | B2 | * | 1/2005  | Tidball et al. | ........ | 235/380    |
| 7,213,742 | B1 | * | 5/2007  | Birch et al.   | ........ | 235/375    |
| 7,316,350 | B2 | * | 1/2008  | Algiene        | ........ | 235/380    |
| 7,447,731 | B2 | * | 11/2008 | Calo et al.    | ........ | 709/201    |
| 7,455,222 | B2 | * | 11/2008 | Beck et al.    | ........ | 235/380    |
| 7,740,170 | B2 |   | 6/2010  | Singh et al.   |          |            |
| 7,770,786 | B1 | * | 8/2010  | Birch et al.   | ........ | 235/379    |
| 7,774,402 | B2 | * | 8/2010  | Singh et al.   | ........ | 709/201    |
| 7,797,233 | B2 |   | 9/2010  | Sobek          |          |            |
| 7,900,826 | B2 | * | 3/2011  | Feldman et al. | ........ | 235/380    |
| 7,905,398 | B1 | * | 3/2011  | Persaud et al. | ........ | 235/380    |
| 7,970,669 | B1 | * | 6/2011  | Santos         | ........ | 705/30     |
| 8,073,774 | B2 | * | 12/2011 | Pousti         | ........ | 705/40     |

(Continued)

OTHER PUBLICATIONS

Written Opinion and International Search Report issued in related PCT Patent Application PCT/US2012/026621 filed on Feb. 24, 2012 dated May 31, 2012, 19 pages.

*Primary Examiner* — Andrew Joseph Rudy
(74) *Attorney, Agent, or Firm* — Armstrong Teasdale LLP (57) ABSTRACT

A method for activating and funding a stored value, prepaid card account includes acquiring, with a point of sale (POS) device, a first data set associated with the card and purchase thereof, and a second data set associated with the card and activation, deactivation, funding, loading, and reloading thereof. The method also includes transmitting a specific transaction trigger amount for card account activation and transmitting the second data set across a universal payment network to an authorization system associated with the second data set. The method further includes transmitting, from the authorization system, a transaction approval message to the POS including data relating to a funded value of the account, an electronic settlement message causing payment to the merchant for selling the card, an electronic message in the amount of the funded value of the account plus the specific transaction trigger amount, and an electronic message to debit the account.

27 Claims, 7 Drawing Sheets

(56) References Cited

U.S. PATENT DOCUMENTS

| | | |
|---|---|---|
| 8,146,806 B2 * | 4/2012 | Monk .......................... 235/380 |
| 8,190,480 B1 * | 5/2012 | Ahlers et al. ................... 705/17 |
| 8,244,612 B2 * | 8/2012 | Chakiris et al. ................ 705/35 |
| 8,245,910 B2 * | 8/2012 | Sullivan et al. .............. 235/379 |
| 8,286,863 B1 * | 10/2012 | Brooks ........................ 235/380 |
| 8,308,061 B2 * | 11/2012 | Persaud et al. ............... 235/380 |
| 8,341,021 B2 * | 12/2012 | Ahlers et al. ................... 705/17 |
| 8,423,464 B2 * | 4/2013 | Vollmer et al. ................. 705/41 |
| 8,452,662 B2 * | 5/2013 | Ahlers et al. ................... 705/17 |
| 2002/0046341 A1 | 4/2002 | Kazaks et al. |
| 2008/0200144 A1 * | 8/2008 | Ginsberg et al. ............. 455/407 |
| 2009/0099965 A1 | 4/2009 | Grant, IV |
| 2009/0327087 A1 | 12/2009 | Beck et al. |
| 2012/0303425 A1 * | 11/2012 | Katzin et al. ................ 705/14.4 |

* cited by examiner

METHOD AND SYSTEM FOR ACTIVATION AND FUNDING OF PREPAID CARD ACCOUNTS WITHIN A RESTRICTED AUTHORIZATION NETWORK

CROSS REFERENCE TO RELATED APPLICATIONS

This application claims the benefit of U.S. Provisional Application Ser. No. 61/446,814, filed Feb. 25, 2011, and titled "UNIVERSAL ACTIVATION AND DEACTIVATION OF STORED VALUE AND RELOADABLE ACCOUNTS USING RESTRICTED AUTHORIZATION NETWORKS", the contents of which are hereby incorporated by reference in their entirety.

BACKGROUND

The field of the disclosure relates generally to the payment card industry, and more specifically, to methods and systems relating to universal activation, deactivation, and funding of reloadable, stored value, prepaid cards and the associated access and card accounts, for example, via restricted authorization networks.

The current configuration of the payment card industry includes both open loop and closed loop networks. Specifically, open and closed loop networks have been built on local, regional, national and international scales. For example, banking systems communicate via open loop networks that typically utilize standardized architectures and protocols, such as International Organization for Standardization (ISO) standard 8583, to ensure interoperability worldwide from retailer, to bank card networks, to bank card processors.

Examples of open loop bank card networks include Visa®, MasterCard®, American Express®, and Discover®. Services offered by these companies include credit, debit, prepaid, and general purpose reloadable card services. Further examples of similar open loop networks include network associated with banking, for example, Cirrus®, Plus®, Starcard®, and Interlink® signature and pin-based debit card networks. The scope of the worldwide open loop, payment network includes over 20 million points of sale/points of payment, i.e., POS/POP, or merely POS.

Closed loop networks typically communicate via proprietary architectures and protocols directly between POS systems at retailers and switching platforms where databases associated with the various card accounts reside. Such closed loop network systems are developed using proprietary protocols and processing architectures. Therefore, gateway switches are needed to complete protocol mapping and translation between the various proprietary systems. Closed loop networks may operate from tens to a few hundred thousand points of payment or service. Examples of such closed loop networks include retail card programs such as Apple iTunes®, Starbucks®, Facebook®, and Target® gift cards.

Hybrid networks have been created that utilize a discrete subset of an international open loop bank card network to emulate the features of the proprietary closed loop network. These hybrids are often referred to as restricted authorization network(s) or RAN(s). A RAN typically is built around a common loyalty, geographic, or business theme that provides a natural and often obvious relationship for the network to operate. An example would be a gift card for a particular mall, and usable with at least a majority of the retailers associated with the particular mall.

Retail and service oriented companies have created proprietary, closed loop, processing platforms where transactional gateways and bridges to open loop networks are typically implemented and segmented separately from the internal POS systems. Transactional routing and custom logic supporting message translation is used within a gateway switch to link internal POS networks to the open loop networks. Both closed loop processing platforms and open loop processing platforms may include virtual Internet, mobile sites, and electronic wallets where a plurality of funded prepaid accounts reside within their domain of operation.

In certain applications, a physical format of prepaid cards typically is proprietary to the networks for which the card has been assigned. Some cards utilize only a barcode while others utilize a magnetic strip (or stripe). Still others may incorporate both or still further the well known 16-digit card number may be printed (or imprinted) on such cards. In summary, card structures vary between open and closed loop networks. One specific format is utilized for payment cards intended for use in the open loop networks which allows such cards to traverse the entire 20 million points of the worldwide open loop network. Alternatively, proprietary closed loop cards are limited to a single network and the finite number of locations available to the card issuer and processor.

In regard to card activation services for both the open loop and closed loop network, activation networks currently exist in the form of direct connections to retail POS/POP systems. Such connections may be, via Web based or direct connect client/server architectures, via mobile applications and gateways, as features of the merchant acquirer networks and services, as applications that reside within POS systems, and as features of the global, universal payment networks such as VISA®, MasterCard®, Discover®, and American Express®. The majority of stored value, prepaid card accounts are activated via closed loop, retail issuers. Other closed loop payment card activations are via gift card mall services offered by various entities and many others as well as via web-based applications. Industry examples of companies offering and managing activation and funding networks include inComm®, Blackhawk Network, Green Dot®, NetSpend$^{SM}$, and PayPal®.

Growth in retail and service industry card programs in the United States has reached a plateau, with minimal year over year growth. The industry is researching opportunities to leverage marketing and service partner relationships to offer new stored value, products and services. One of the problems and issues with current stored value products and the processes used to activate, deactivate, load, and reload cards and virtual accounts is that activation and funding of a specific prepaid card is typically limited to the specific point of sale systems where proprietary closed loop, network software has been installed to support the activation process. In such systems integration of proprietary software requires significant testing and integration tasks that may also need to span various POS hardware manufacturers and software systems. The result is extensive time and labor needed to implement the proprietary activation solution.

Another of the problems and issues with current stored value, prepaid products and the associated processes is that open loop activation of such cards requires software changes to support the network specific transactions proprietary to the universal payment networks. This solution also entails added cost and effort for integration and testing prior to full scale implementation across a retail POS platform.

With both open and closed loop networks residing within the United States, the Federal Reserve Bank's Automated Clearing House (ACH) and wire transfer network is used to complete electronic transfers of funds from one bank account to another. An equivalent central banking system and network is prevalent in countries worldwide and is used to complete electronic settlement in support of payments for goods and services completed using stored value, prepaid cards.

Finally, physical card formats are manufactured with varying magnetic stripe and bar code data which are proprietary to the network, resulting in added cost and complexity for maintaining inventory for the various proprietary card networks. As such, retailers are hesitant to offer, sell and activate stored value cards that are not associated with the universal payment networks.

BRIEF DESCRIPTION

In one aspect, a method for activating and funding a stored value, prepaid card account is provided. The method includes acquiring, with a point of sale (POS) device, a first data set associated with a stored value, prepaid card, the first data set also associated with a purchase of the stored value, prepaid card. The method also includes acquiring, with the POS device, a second data set associated with the stored value, prepaid card, the second data set also associated with activation, deactivation, funding, loading, and reloading of a stored value, prepaid card account. The method further includes transmitting at least one specific transaction trigger amount pre-defined for card activation and the second data set from the POS device onto a universal payment network. The method also includes receiving the transmission at an authorization system associated with the second data set. The method further includes transmitting, from the authorization system, a transaction approval message to the POS, the transaction approval message including data relating to a funded value of the stored value, prepaid card account. The method also includes transmitting, from the authorization system, an electronic settlement message causing a payment to be made to the merchant for selling the stored value, prepaid card. The method further includes transmitting, from the authorization system, an electronic message in the amount of the funded value of the stored value, prepaid card account plus the specific transaction trigger amount, the electronic message operable to debit an account of an entity with which the stored value, prepaid card may be redeemed. The method also includes settling the amount of the funded value of the stored value, prepaid card account plus the specific transaction amount with an operator of the authorization system and a universal payment network.

In another aspect, one or more non-transitory computer-readable storage media is/are provided. The non-transitory computer-readable storage media has computer-executable instructions embodied thereon, wherein when executed by at least one processor, the computer-executable instructions cause the at least one processor to acquire, with a point of sale (POS) device, a first data set associated with a stored value, prepaid card, the first data set also associated with a purchase of the stored value, prepaid card. The computer-executable instructions also cause the at least one processor to acquire, with the POS device, a second data set associated with the stored value, prepaid card, the second data set also associated with an activation, deactivation, funding, loading, and reloading of a stored value, prepaid card account. The computer-executable instructions further cause the at least one processor to transmit at least one specific transaction trigger amount pre-defined for card activation and the second data set from the POS device onto a universal payment network. The computer-executable instructions also cause the at least one processor to receive the transmission at an authorization system associated with the second data set and transmit, from the authorization system, a transaction approval message to the POS, the transaction approval message including data relating to a funded value of the stored value, prepaid card account. The computer-executable instructions further cause the at least one processor to transmit, from the authorization system, an electronic settlement message causing a payment to be made to the merchant for selling the stored value, prepaid card. The computer-executable instructions also cause the at least one processor to transmit, from the authorization system, an electronic message in the amount of the funded value of the stored value, prepaid card account plus the specific transaction trigger amount, the electronic message operable to debit an account of an entity with which the stored value, prepaid card may be redeemed. The computer-executable instructions further cause the at least one processor to settle the amount of the funded value of the stored value, prepaid card account plus the specific transaction amount with an operator of the authorization system and the universal payment network.

The features, functions, and advantages that have been discussed can be achieved independently in various embodiments or may be combined in yet other embodiments further details of which can be seen with reference to the following description and drawings.

DETAILED DESCRIPTION

The described embodiments are directed to an industry need that exists for a standardized, uniform card structure and format and uniform activation and funding network crossing the boundaries of proprietary systems and processing platforms in global use today.

With regard to the universal card described herein, it generally refers to a stored value, prepaid card issued to consumers to use as a form of payment, allowing the cardholder to buy goods and services. In physical embodiments, the stored value, prepaid card and the associated universal card account may take the form of a bankcard, a coupon, a pharmacy card, virtual wallet, or another third party system product. The stored value, prepaid card at least partially defines a portal to the associated stored value, prepaid card account that includes, without limitation, prepaid access accounts.

The universal payment network, also referred to as a card payment network, described herein refers to a global network for routing a Primary Account Number (PAN) and other routable account numbers. Specifically, the universal payment network is a transaction network system that implements and manages the mechanics of the electronic transactions from point of sale or point of payment, i.e., POS/POP, or merely POS, to the card issuer and processor.

A common universal payment network protocol is ISO 8583, and this protocol as referred to herein is generally described as a protocol for financial transaction card originated messages. ISO 8583 is an interchange message specification that is the International Organization for Standardization standard for systems that exchange electronic transactions made by cardholders using physical and virtual payment cards linked to funded accounts.

The systems described herein provide fully managed and fully automated delivery of commissions owed to a distributor and activator of card accounts. In embodiments, such systems incorporate certain restricted access network (RAN) features. For example, embodiments include a RAN mall configuration which is a congregation of retailers implemented via RAN technology using multiple prepaid universal cards distributed via a third party distributor. Such systems incorporate, for example, transaction trigger amounts, both fixed and variable, which are specific amounts that trigger an event within the account activation and funding system. Further, customized merchant, program network restrictions may be accomplished through filtered authorization networks. In embodiments, PAN status changes are based on predefined choices based on a trigger amount and certain processes, which are described below, are initiated after specific ISO 8583 messages are received through the universal payment network including, but not limited to, activation, loading, reloading, reversal/void deactivation, commission, commission reversal, and others.

For example, in response to an activation request message, an account is set to "Active" status and funded. The account may be the actual universal payment card used at the POS or the account may be a third party, proprietary account tied to the universal payment card. A reversal/void operation indication within the message cancels an activation transaction prior to settlement causing the activated account to be reset to its original, inactive, and unfunded state. A deactivation operation indication within the message cancels an activation transaction some time after settlement causing the activated account to be reset to its original, inactive state. A commissions process is indicated in the authorization messages and represents an amount owed by program owner to distributor or card activator and similarly a commissions reversal indication is related to a process of reversing payment of commission by a card distributor to program owner.

In at least some of the embodiments described herein, methods and processes are practiced by which PAN and trigger authorization amounts are entered into point of payment for delivery via universal payment network. These include, but are not limited to, a manual entry that is keyed in via number pad or key board, a virtual entry made via the World Wide Web or via an online computer system. Such entries also include, without limitation, an entry made by swiping an encoded magnetic stripe through a magnetic stripe reader. Furthermore, such entries include, without limitation, an entry made by an optical machine reading a bar code, for example, a machine-readable representation of data in one dimension (1D), two dimensions (2D), 3D, and holographic formats. Moreover, such entries include, without limitation, entries made via cellular and portable devices through wireless networks and sometimes referred to as mobile apps, via contactless entry, for example, NFC (near field communication), WiBree, RFID and other proprietary entry systems which wirelessly transmit PAN data, and other proprietary methods.

Some embodiments described herein involve the use of one or more electronic or computing devices. Such devices typically include a processor or controller, such as a general purpose central processing unit (CPU), a graphics processing unit (GPU), a microcontroller, a reduced instruction set computer (RISC) processor, an application specific integrated circuit (ASIC), a programmable logic circuit (PLC), and/or any other circuit or processor capable of executing the functions described herein. The above examples are exemplary only, and thus are not intended to limit in any way the definition and/or meaning of the term processor.

Such electronic or computing devices also typically include a memory coupled to the processor. The memory may include one or more tangible, non-transitory, computer readable media, such as, without limitation, random access memory (RAM), dynamic random access memory (DRAM), static random access memory (SRAM), a solid state disk, a hard disk, read-only memory (ROM), erasable programmable ROM (EPROM), electrically erasable programmable ROM (EEPROM), and/or non-volatile RAM (NVRAM) memory.

The methods described herein may be encoded as executable instructions embodied in a tangible, non-transitory, computer readable medium, including, without limitation, a storage device and/or a memory device. Such instructions, when executed by a processor, cause the processor to perform at least a portion of the methods described herein. Moreover, as used herein, the term "non-transitory computer-readable media" includes all tangible, computer-readable media, such as a firmware, physical and virtual storage, CD-ROMs, DVDs and another digital source such as a network or the Internet, as well as yet to be developed digital means, with the sole exception being a transitory, propagating signal.

Figure 1:
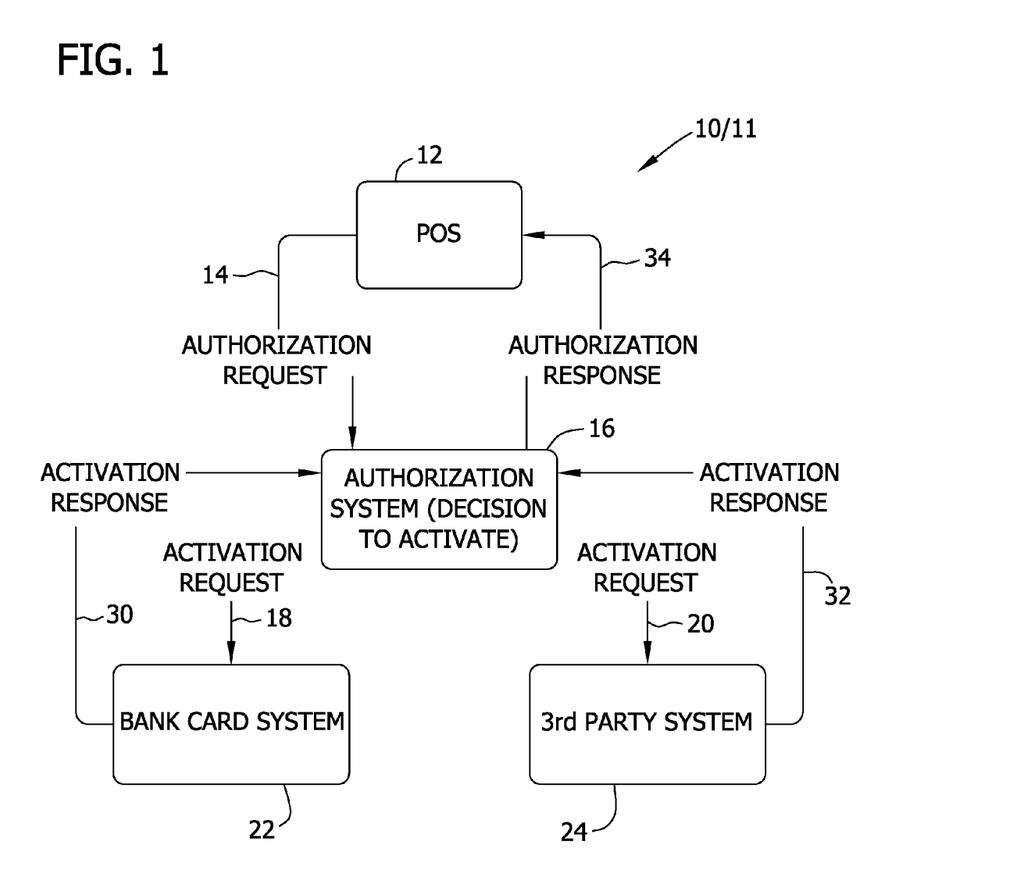
FIG. 1 is a block diagram of a universal activation messaging architecture.

FIG. 1 is a block diagram of a universal activation messaging architecture 10 of a universal payment network 11. Architecture 10 includes a point of sale/point of purchase (POS/POP) system 12 located, for example, at a merchant's place of business. POS/POP system 12 of the merchant, including, without limitation, physical, virtual, and mobile, submits an authorization 14 request through universal payment network 11 to an authorization system 16. Authorization system 16 decisions the request and, if an activation and funding approval is determined, an activation request 18 and/or 20 is submitted to an appropriate activation and funding system, e.g., a bank card system 22 or a separate, third party system 24. An activation response message 30 and/or 32, for example an approval, is then sent back to POS/POP system 12 through universal payment network 11, via authorization system 16 as an authorization response 34 through architecture 10 of universal payment network 11. In one embodiment, bank card system 22 receives the activation request from authorization system 16 once a decision has been made and the reloadable prepaid card account is activated and funded. In another embodiment, third party system 24 receives the activation request from authorization system 16 once a decision has been made and the reloadable prepaid card account is activated and funded as appropriate.

Figure 2:
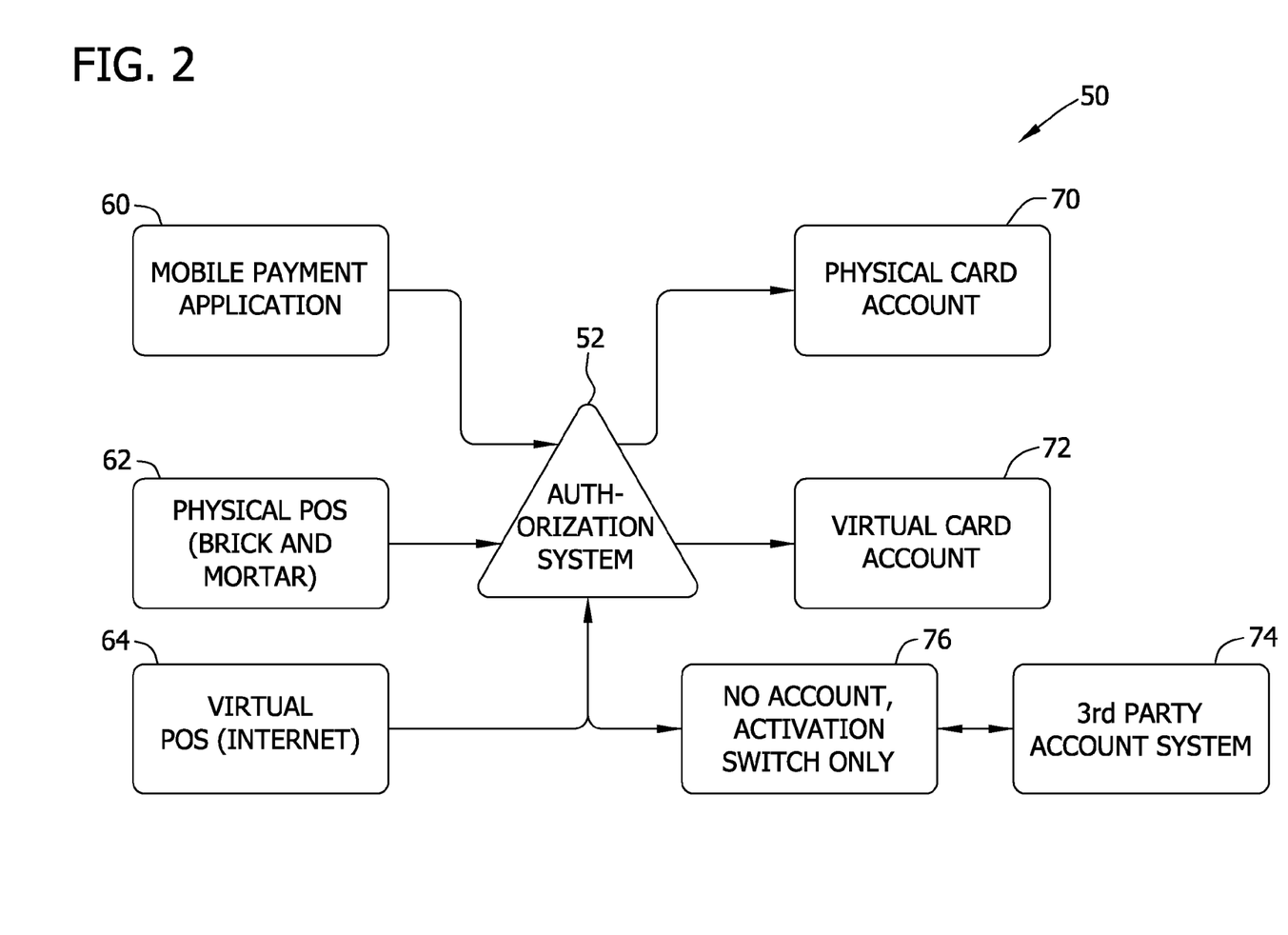
FIG. 2 is a block diagram of a universal activation gateway architecture.

FIG. 2 is a block diagram of a universal activation gateway architecture 50. In architecture 50, activation requests are received by authorization system 52 from the following entry points: mobile payment applications 60, physical POS (brick and mortar) merchant locations 62, and virtual POS (Internet) applications 64. When authorization system 52 determines that the request is a valid authorization activation request, the authorization system 52 and proceeds with at least one of the following appropriate actions: activation and funding of a physical, reloadable, prepaid card account 70, activation and funding of a virtual, reloadable, prepaid card account 72 or PAN, submission of activation request to a third party account system 74, where there is no account and authorization system 52 is acting as a switch 76 only to facilitate the activation of an account.

Figure 3:
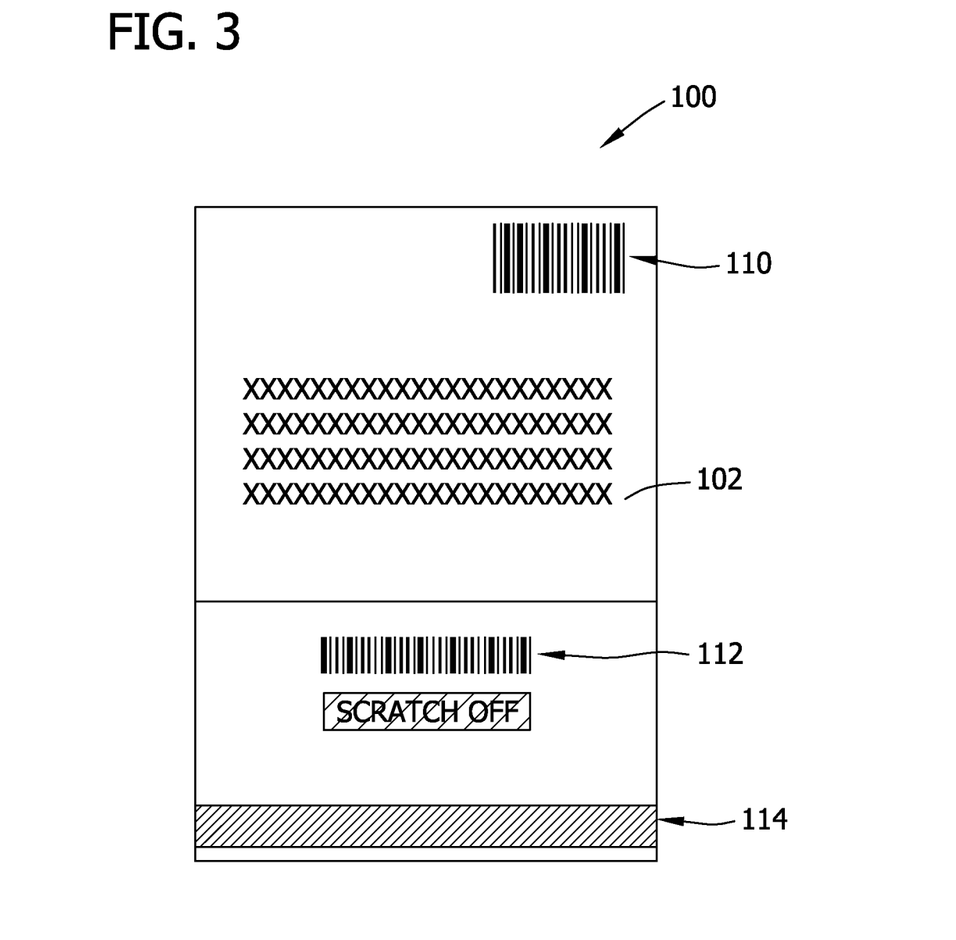
FIG. 3 is a depiction of a universal card that has a format operable with the point of sale (POS) systems associated with the architectures of FIGS. 1 and 2.

FIG. 3 is a depiction of a universal stored value card 100 that has a format operable with the POS/POP systems associated with architectures 10 and 50 of FIGS. 1 and 2, respectively. Card 100 has a card front that is not shown in FIG. 3 as it merely provides an area for the card sponsor to add card art, personal logos, and any other display and marketing items. A back 102 of card 100 includes a first barcode 110 on a top 112 of card back 102 that has the face value of card 100 encoded thereon. Merchants scan this first barcode 110 to ring up the amount that card holder will need to pay in their POS/POP system. In the illustrated embodiment, a second barcode 112 is placed on the lower half of the card back 102 which merchants scan to ring up a trigger activation amount of an inactive card as further described herein. A magnetic stripe 114 contains encoded PAN data for the card 100 being activated and sold. Card 100 may be, for example, and without limitation, a stored value, prepaid card.

Figure 4A:
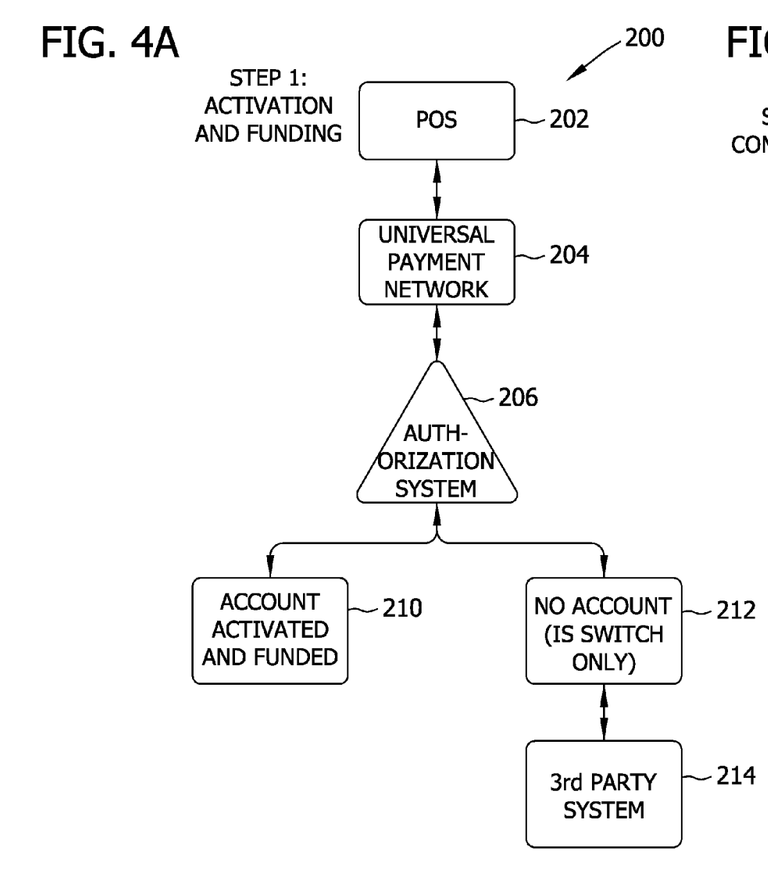
FIG. 4A is a flowchart illustrating a stored value, prepaid card activation and funding process.

FIG. 4A is a flowchart illustrating a stored value, prepaid card activation and funding process 200. To activate and fund a card account, such as card 100 (shown in FIG. 3), a merchant POS/POP system 202 sends an authorization request over a universal payment network 204 using a PAN and a predetermined amount. Universal payment network 204 routes the request to authorization system 206 based on the PAN. Upon receipt of the authorization request, authorization system 206 will determine if activation can take place. For example, an authorization account 210 is activated and funded and response of "approved" is sent back to POS system 202 from authorization system 206, with an approval code representing the amount for which card 100 was funded.

If the authorization request is associated with an entity other than that associated with authorization system 206, the request for activation is forwarded from authorization system 206 to an appropriate third party system 214. Upon receipt of a successful activation response from third party system 214, a response of "approved" is sent back through universal payment network 204 to POS/POP system 202 via authorization system 206. With regard to third party system 214, a reloadable, prepaid card account is activated and a response of "activation successful" is sent back to authorization system 206.

Figure 4B:
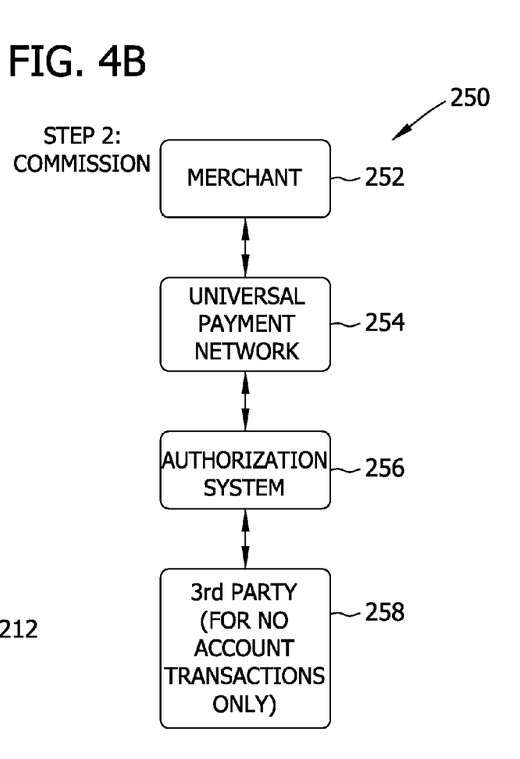
FIG. 4B is a flowchart illustrating a commission payment process.

FIG. 4B is a flowchart illustrating a commission payment process 250. A merchant POS/POP system 252 sends the authorized transaction to a universal payment network 254 and the merchant receives commission payments via universal payment network 254. Universal payment network 254 processes the transaction, sends it to authorization system 256, and collects the commission payment. Authorization system 256 processes the authorized transaction and remits the commission payments to universal payment network 256. If the transaction is for a third party 258, and authorization system 256 is only a switch, authorization system 256 notifies third party 258 of the transaction settlement and collects the commission payments. Third party 258 remits the commission payments to authorization system 256 and, therefore, to the entity that provides authorization system 256 with the settled transaction.

Figure 5:
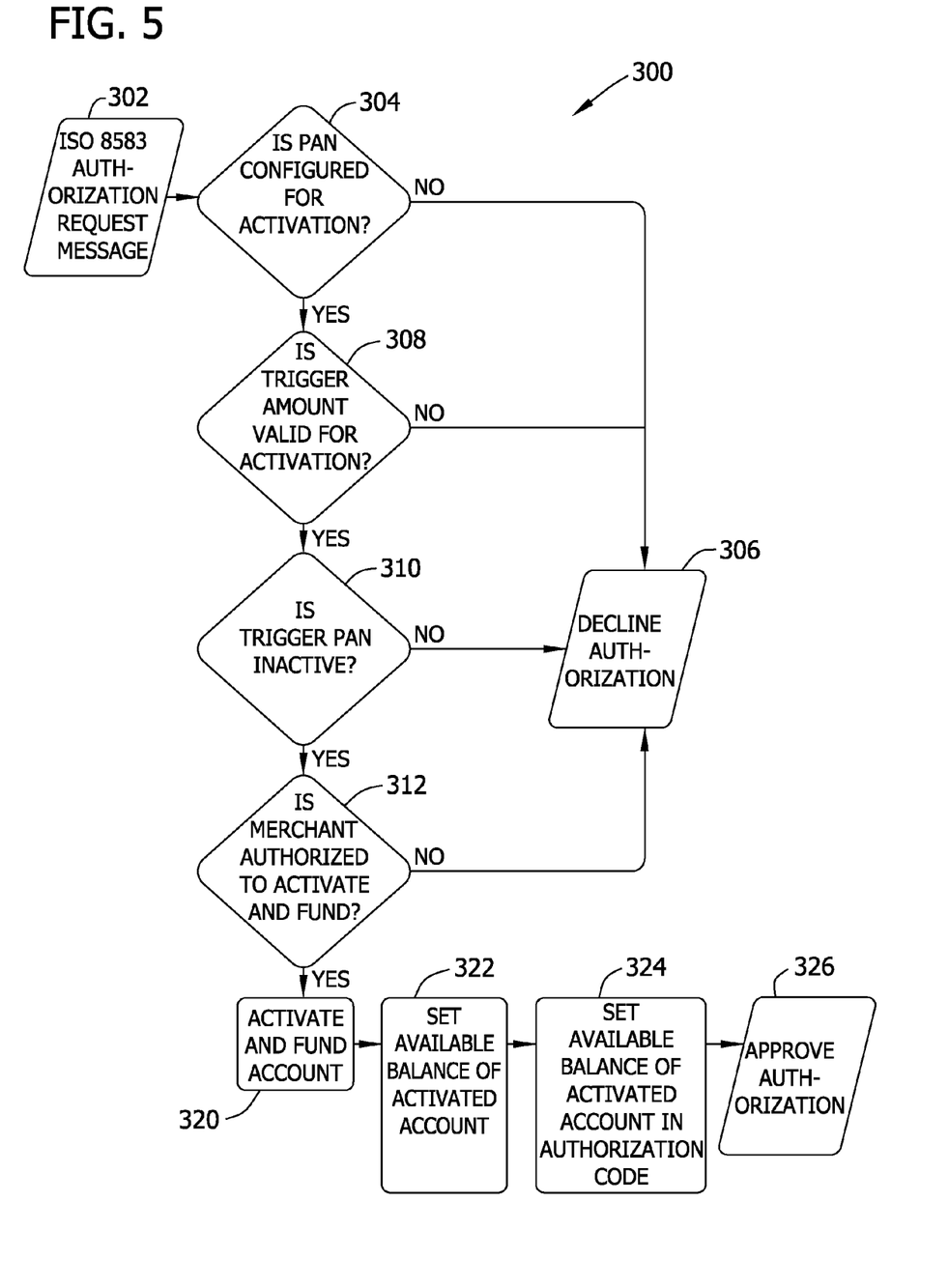
FIG. 5 is a flowchart illustrating account activation and funding logic flow.

FIG. 5 is a flowchart illustrating account activation and funding logic flow 300. In an exemplary embodiment, an ISO 8583 authorization request message (e.g., a 0100 authorization request message) is sent 302 via universal payment network 204 (shown in FIG. 4A) to authorization system 206. Authorization system 206 determines 304 if the PAN in the authorization request message has been configured to perform activation functions. If not, a "decline" response is sent 306 to the message originator. Authorization system 206 determines 308 if the transaction trigger amount in the authorization request message is valid for product activation, verifying against a predetermined amount or a calculated percentage of product load. If the trigger amount is invalid, a "decline" response is sent 306 to the message originator. Authorization system 206 determines 310 if the PAN is in an inactive state and therefore ready for product activation and funding either as the original load amount or as a reload amount. If not, a "decline" response is sent 306 to the message originator. Finally, authorization system 206 system analyzes merchant information sent in the authorization request messages to determine 312 if the merchant is authorized to perform product activation and funding. If not, a "decline" response is sent 306 to the message originator.

If the determinations described above are all positive, authorization system 206 performs activation and funding 320 of the account associated to the PAN, either in a bank card processing system, coupon, virtual wallet, credit issuing system, or similar system. Upon activation and funding, authorization system 206 sets 322 the value of available balance fields in the authorization response message to the balance available of the activated account. Authorization system 206 sets 324 the value of the authorization response code in the authorization response message to the available balance of the activated product, and an "approval" response is sent 326 to the message originator.

Figure 6:
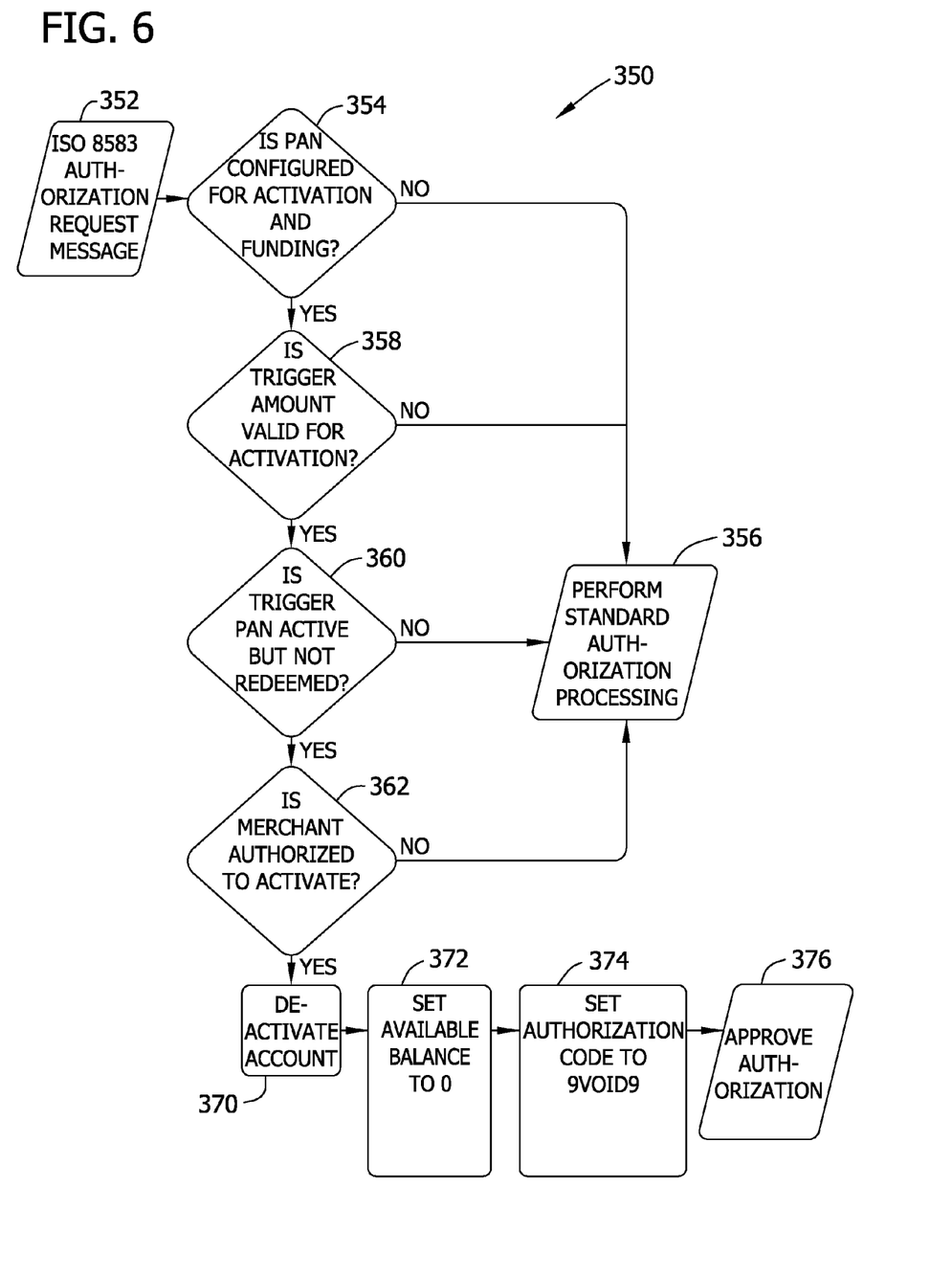
FIG. 6 is a flowchart illustrating account deactivation and voiding logic flow.

FIG. 6 is a flowchart that illustrates account deactivation and voiding logic flow 350. In an exemplary embodiment, an ISO 8583 authorization request message (e.g., a 0100 authorization request message) is sent 352 via universal payment network 204 (shown in FIG. 4A) to authorization system 206 (shown in FIG. 4B). Authorization system 206 determines 354 if the PAN in the authorization request message has been configured to perform activation and funding functions. If not, authorization system 206 performs 356 standard authorization request processing. Authorization system 206 determines 358 if the transaction amount in the authorization request message is valid for account deactivation, verifying against a predetermined amount or a calculated percentage of product load. If the amount is not a deactivation trigger, authorization system 206 performs 356 standard authorization request processing. Authorization system 206 determines 360 if the PAN is in an active state but has not been used for redemption, and therefore ready for account deactivation. If not, authorization system 206 performs 356 standard authorization request processing. Authorization system 206 analyzes merchant information sent in the authorization request messages to determine 362 if the merchant is authorized to perform account activation. If not, authorization system 206 performs 356 standard authorization request processing.

If the determinations described above are all positive, authorization system 206 performs deactivation 370 of the account associated to the trigger PAN, either in a bank card processing system, coupon, virtual wallet, credit issuing system, or similar system. Authorization system 206 sets 372 the value of available balance fields in the authorization response message to zero, indicating that the activated account has been deactivated. Authorization system 206 sets 374 the value of the authorization response code in the authorization response message to, for example, "9VOID9", in one embodiment, indicating that the activated product has been deactivated, and an approval response is sent 376 to the message originator.

Figure 7:
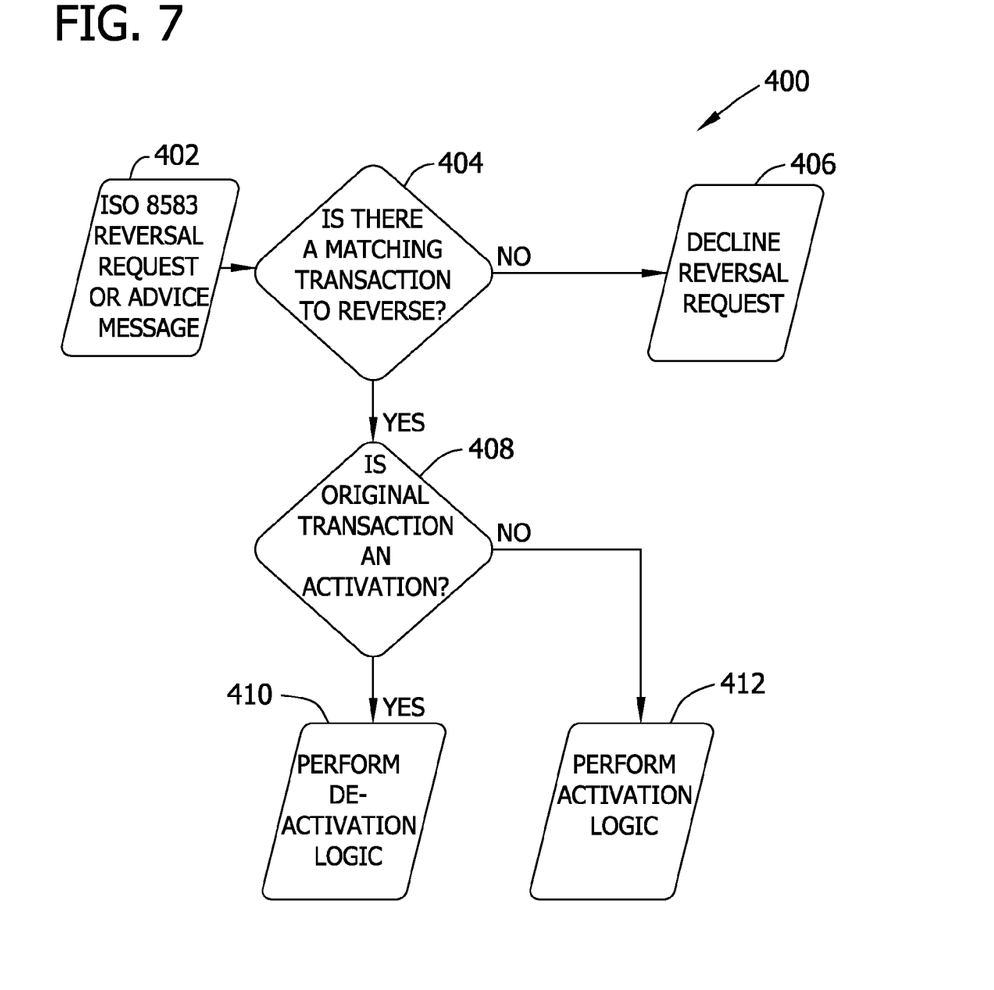
FIG. 7 is a flowchart illustrating a transaction reversal logic flow.

FIG. 7 is a flowchart illustrating a transaction reversal logic flow 400. In one embodiment, a ISO 8583 reversal request/advice message (e.g., an ISO 8583 0400 reversal request message or an ISO 8583 0420 reversal advice message) is sent 402 via universal payment network 204 (shown in FIG. 4A) to authorization system 206 (shown in FIG. 4A). Authorization system 206 attempts to match 404 the reversal to a previous transaction. If no match is found, authorization system 206 performs 406 standard reversal processing, declining the reversal request.

Authorization system 206 determines 408 if the original transaction is an activation. If so, authorization system 206 performs 410 deactivation logic flow 350 (shown in FIG. 6). Otherwise, authorization system 206 determines 408 if the original transaction is a deactivation. If so, authorization system 206 performs 412 activation logic flow 300 (shown in FIG. 5).

The following paragraph describes an example application for the universal account activation service and associated method described herein, and is referred to as a restricted authorization network (RAN) activation service, or RASER. RASER refers to a method for activating and funding a fixed or variable denomination RAN prepaid card account at a physical merchant location through their existing POS or payment terminal One benefit to such an activation and funding process is that no information technology changes or integration at either the merchant's end (the POS/POP) or at the provider of authorization services, e.g., StoreFinancial, are required.

Prior to activation and funding, a RAN prepaid card is basically a dormant card account tied to one of the open loop, universal payment network systems (e.g., VISA® or MasterCard®) via a PAN. The account is set to a pre-activated and unfunded system state, waiting for the transaction trigger amount, RAN POS data, and assigned PAN to be sent and received via the universal payment network.

After the sale of the stored value, prepaid card is completed, a clerk is required to "ring up" the predetermined trigger amount in the POS/POP system of the merchant. As an example, a trigger amount may be 1/100th of the face value of the prepaid card. Another known unique amount may be used as the trigger amount. The clerk swipes the inactive prepaid card through the POS system as the payment method for the trigger transaction amount. This swipe is in essence an attempt to pay a trigger amount, e.g., $0.25 for a $25.00 card, with an inactive card having an expected funding value.

The authorization request for the 25 cents comes to the authorization system via one of the universal payment card networks and the authorization system identifies the post-authorization notification PAN of the inactive card account, recognizes the trigger amount, verifies the retailer as an approved member of the RAN prepaid card, and uses the information to activate the card account.

An authorization approval is sent back to the POS/POP from the authorization system the prepaid card purchaser can leave with an activated and funded card with a full, e.g., $25.00, balance. Substantially concurrently, the authorization system generates an electronic settlement for the funded value of the prepaid card plus the trigger amount, e.g., $25.25, to be debited from, for example, the merchant's bank settlement account. In some embodiments, the settlement occurs for the merchant two or three days later for the trigger and commission amounts, via the universal payment network, and the authorization system causes the settlement to be paid out via normal procedures.

In a step-by-step summary of the above, a customer purchases and pays for a prepaid card in a first part of transaction. The clerk completing the sale for the merchant rings up the trigger amount in POS system, and enters the PAN of the inactive prepaid card into the POS system via card swipe, scan of a barcode, or manual entry. The authorization system receives the authorization request for the trigger amount, sets a status of the particular card to "active" and sends an authorization approval to the merchant's POS system. The authorization system also generates an electronic settlement file in the amount of the funded value of the prepaid card plus the trigger amount for the newly activated and funded card account and debits the bank account of the corporate client associated with the merchant for the sum of the funded value and trigger amount for the prepaid card. In the course of normal settlement operations, the entity associated with the authorization system receives the settlement request for the trigger amount and the authorization service settles the trigger amount with the particular bank card network. A similar process may be applied for mobile, contactless, virtual wallet, and virtual card environments and a wide variety of product types.

Technical effects of the methods, systems, and computer-readable media described herein include at least one of: (a) acquiring, with a point of purchase device, a first data set associated with a stored value, prepaid card, the first data set associated with a purchase of the card; (b) acquiring, with the point of sale device, a second data set associated with the stored value, prepaid card, the second data set associated with an activation and funding of the card account; (c) transmitting at least a specific transaction amount pre-defined for card activation and funding and the second data set from the point of sale device onto a universal payment network; (d) receiving the transmission at an authorization system associated with the second data set; (e) transmitting, from the authorization system, a transaction approval message to the point of sale, the transaction approval message including data relating to a funded value of the stored value, prepaid card; (f) transmitting, from the authorization system, an electronic message causing a payment to be made to the merchant for selling the stored value, prepaid card; (g) transmitting, from the authorization system, an electronic settlement message in the amount of the funded value of the stored value, prepaid card plus the specific transaction amount, the electronic message operable to debit an account of an entity with which the stored value, prepaid card may be redeemed; and (h) settling the amount of the funded value of the stored value, prepaid card plus the specific transaction trigger amount with an operator of the authorization system and a universal payment network.

As used herein, an element or step recited in the singular and proceeded with the word "a" or "an" should be understood as not excluding plural elements or steps unless such exclusion is explicitly recited. Furthermore, references to "one embodiment" of the present invention or the "exemplary embodiment" are not intended to be interpreted as excluding the existence of additional embodiments that also incorporate the recited features.

This written description uses examples to disclose various embodiments, which include the best mode, to enable any person skilled in the art to practice those embodiments, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for activating and funding a stored value prepaid card account, said method comprising:
   acquiring, with a point of sale (POS) device, a first data set associated with a stored value prepaid card, the first data set also associated with a purchase of the stored value prepaid card;
   acquiring, with the POS device, a second data set associated with the stored value prepaid card, the second data set also associated with an activation, deactivation, funding, loading, and reloading of a stored value prepaid card account, the second data set including a transaction trigger amount pre-defined for card activation;
   transmitting the second data set from the POS device onto a universal payment network;
   receiving the transmission at an authorization system associated with the second data set;
   transmitting, from the authorization system, an authorization response message to the POS, the authorization response message including data relating to a funded value of the stored value prepaid card account;
   transmitting, from the authorization system, an electronic message causing a payment to be made to the merchant for selling the stored value prepaid card;
   transmitting, from the authorization system, an electronic settlement message in the amount of the funded value of the stored value prepaid card account plus the transaction trigger amount, the electronic settlement message operable to debit an account of an entity with which the stored value prepaid card may be redeemed; and
   settling the amount of the funded value of the stored value prepaid card account plus the transaction trigger amount with an operator of the authorization system and the universal payment network.

2. The method according to claim 1 wherein, for an activation and funding indication within the second data set, said method further comprises:
   setting an account associated with the stored value prepaid card to active status; and
   funding the account associated with the stored value prepaid card.

3. The method according to claim 1 wherein, for a reversal/void indication within the second data set, said method further comprises:
   canceling a previous activation transaction prior to settlement; and
   resetting an account associated with the stored value prepaid card to an original, inactive state.

4. The method according to claim 1 wherein, for a deactivation indication within the second data set, said method further comprises:
   canceling a previous activation and funding transaction after settlement; and
   resetting a prepaid card account associated with the stored value prepaid card to an original, inactive state.

5. The method according to claim 1 wherein transmitting an electronic message causing a payment to be made to the merchant for selling the stored value prepaid card comprises one of:
   indicating a commissions process in an electronic message that represents an amount owed to a card distributor or card activator; and
   indicating a commissions reversal process in a universal payment network authorization message that represents reversing payment of an amount paid a card distributor or card activator.

6. The method according to claim 1 wherein the second data set further includes a Primary Account Number (PAN), wherein acquiring, with the POS device, a second data set associated with the stored value prepaid card comprises entering the PAN and the transaction trigger amount into the POS device for delivery via the universal payment network.

7. The method according to claim 1 wherein transmitting an authorization response message to the POS comprises transmitting a response to an originating POS system which includes an authorization response code in one or more fields of an universal network message, the authorization response code included in the universal network message through manipulation of the content of certain fields of the authorization message, such fields included in the response to the originating POS system.

8. The method according to claim 6 wherein receiving the transmission at an authorization system associated with the second data set comprises routing the transmission to the authorization system based on the PAN received by the universal payment network.

9. The method according to claim 6 wherein transmitting the second data set from the POS device onto a universal payment network comprises sending an authorization request message via the universal payment network to the authorization system.

10. The method according to claim 9 wherein the authorization request message includes the PAN and the transaction trigger amount, wherein receiving the transmission at an authorization system associated with the second data set comprises determining if the PAN in the authorization request message has been configured to perform activation and funding functions.

11. The method according to claim 10 further comprising sending a "decline" response to the POS device if the PAN in the authorization request message has not been configured to perform activation and funding functions.

12. The method according to claim 10 wherein receiving the transmission at an authorization system associated with the second data set comprises determining if the transaction trigger amount in the authorization request message is valid for at least one of account activation and account funding.

13. The method according to claim 12 further comprising verifying the transaction trigger amount against a predetermined amount or a calculated percentage of at least one of card account load and card account reload.

14. The method according to claim 12 further comprising sending a decline response to the POS if the transaction trigger amount in the authorization request message is not valid for account activation and funding.

15. The method according to claim 10 wherein receiving the transmission at an authorization system associated with the second data set comprises determining if the PAN in the authorization request message is in an inactive state and therefore ready for account activation and funding.

16. The method according to claim 15 further comprising sending a decline response to the POS if the PAN in the authorization request message is not in an inactive state.

17. The method according to claim 1 wherein receiving the transmission at an authorization system associated with the second data set comprises determining if the merchant information is indicative of a merchant authorized to perform at least one of account activation and funding.

18. The method according to claim 17 further comprising sending a "decline" response to the POS if the merchant information is not indicative of a merchant authorized to perform at least one of account activation and funding.

19. The method according to claim 1 wherein transmitting an authorization response message via a universal payment network comprises:
setting a value of available balance fields in the authorization response message to the balance available of the activated and funded account;
setting a value of an authorization response code in the authorization response message to the available balance of the activated and funded account;
transmitting the authorization response message to the originating POS via a universal payment network; and
presenting the available balance of the activated and funded account upon the receipt printed at the POS.

20. The method according to claim 10 wherein receiving the transmission at an authorization system associated with the second data set comprises determining if the transaction trigger amount in the authorization request message is valid for account deactivation.

21. The method according to claim 20 further comprising verifying the transaction trigger amount against a predetermined amount or a calculated percentage of at least one of account load and account reload.

22. The method according to claim 20 further comprising sending a "decline" response to the POS if the transaction trigger amount in the authorization request message is not valid for account deactivation.

23. The method according to claim 20 further comprising determining if the PAN in the authorization request message indicates the stored value prepaid card is in an active state, but has not been used for redemption, and is therefore ready for product deactivation.

24. The method according to claim 23 further comprising determining if the merchant information is indicative of a merchant authorized to perform account deactivation.

25. The method according to claim 10 further comprising:
performing deactivation of the stored value prepaid card associated with the PAN in the authorization request message;
setting a message string in the authorization response message to indicate that the activated stored value prepaid card has been deactivated;
transmitting the deactivation message to the originating POS via a universal payment network; and
presenting the deactivation message string upon the receipt printed at the POS.

26. The method according to claim 1 wherein receiving the transmission at an authorization system associated with the second data set comprises:
sending one of a reversal request message and a reversal advice message via the universal payment network to the authorization system;
attempting to match the reversal to a previous transaction;
declining the reversal request if no match is found; and
if the previous transaction is an activation, performing stored value prepaid card account deactivation.

27. One or more non-transitory computer-readable storage media having computer-executable instructions embodied thereon, wherein when executed by at least one processor, the computer-executable instructions cause the at least one processor to:
acquire, with a point of sale (POS) device, a first data set associated with a stored value prepaid card, the first data set also associated with a purchase of the stored value prepaid card;
acquire, with the POS device, a second data set associated with the stored value prepaid card, the second data set also associated with an activation, deactivation, funding, loading, and reloading of a stored value prepaid card account, the second data set including a transaction trigger amount pre-defined for card activation;
transmit the second data set from the POS device onto a universal payment network;
receive the transmission at an authorization system associated with the second data set;
transmit, from the authorization system, an authorization response message to the POS, the authorization response message including data relating to a funded value of the stored value prepaid card account;
transmit, from the authorization system, an electronic message causing a payment to be made to the merchant for selling the stored value prepaid card;
transmit, from the authorization system, an electronic settlement message in the amount of the funded value of the card account plus the transaction trigger amount, the electronic settlement message operable to debit an account of an entity with which the stored value prepaid card may be redeemed; and
settle the amount of the funded value of the stored value prepaid card account plus the transaction trigger amount with an operator of the authorization system and the universal payment network.

* * * * *